United States Patent
Blumka et al.

(10) Patent No.: US 9,966,641 B2
(45) Date of Patent: May 8, 2018

(54) BATTERY PACK

(71) Applicant: LG Chem, Ltd., Seoul (KR)

(72) Inventors: Joseph Blumka, Clarkston, MI (US); Paul Laurain, Sterling Heights, MI (US); Alexander Jeffrey Smith, White Lake, MI (US)

(73) Assignee: LG Chem, Ltd., Seoul (KR)

( * ) Notice: Subject to any disclaimer, the term of this patent is extended or adjusted under 35 U.S.C. 154(b) by 391 days.

(21) Appl. No.: 14/982,486

(22) Filed: Dec. 29, 2015

(65) Prior Publication Data

US 2017/0187079 A1    Jun. 29, 2017

(51) Int. Cl.
*H01M 10/613* (2014.01)
*H01M 10/0525* (2010.01)
(Continued)

(52) U.S. Cl.
CPC ....... *H01M 10/613* (2015.04); *H01M 2/1016* (2013.01); *H01M 2/1094* (2013.01);
(Continued)

(58) Field of Classification Search
CPC ........... H01M 10/613; H01M 10/6563; H01M 10/653; H01M 10/6551; H01M 10/6556;
(Continued)

(56) References Cited

U.S. PATENT DOCUMENTS

| 8,492,642 B2 | 7/2013 | Kim |
| 2005/0111167 A1* | 5/2005 | Yamaguchi ........... B60L 15/007 |
| | | 361/676 |

(Continued)

FOREIGN PATENT DOCUMENTS

| JP | 2004306726 | 11/2004 |
| JP | 2008251378 | 3/2007 |

(Continued)

OTHER PUBLICATIONS

U.S. Appl. No. 14/489,613, filed Sep. 18, 2014 entitled Battery Pack and Method of Controlling an Electric Fan in the Battery Pack.
(Continued)

*Primary Examiner* — Ula C Ruddock
*Assistant Examiner* — Matthew W Van Oudenaren
(74) *Attorney, Agent, or Firm* — Buckert Patent & Trademark Law Firm, PC; John F. Buckert

(57) ABSTRACT

A battery pack has a battery pack housing that defines an interior region, and a battery module that is disposed in the interior region. The battery module has a first battery cell, and a first heat exchanger defining a first flow path portion therethrough. The battery pack further includes a first electric fan and a thermally conductive housing that are disposed in the interior region. The thermally conductive housing has a first housing portion, and at least first and second cooling fins defining a second flow path portion therebetween. At least a portion of the second flow path portion is substantially in-line with the first flow path portion. The first electric fan urges air to flow through an inlet aperture, the first flow path portion, the second flow path portion, and through the first electric fan to a first outlet aperture to cool the battery module.

10 Claims, 10 Drawing Sheets

(51) Int. Cl.
*H01M 10/058* (2010.01)
*H01M 10/653* (2014.01)
*H01M 10/6551* (2014.01)
*H01M 10/6563* (2014.01)
*H01M 2/10* (2006.01)
*H01M 10/6556* (2014.01)

(52) U.S. Cl.
CPC ..... *H01M 10/058* (2013.01); *H01M 10/0525* (2013.01); *H01M 10/653* (2015.04); *H01M 10/6551* (2015.04); *H01M 10/6556* (2015.04); *H01M 10/6563* (2015.04)

(58) Field of Classification Search
CPC ............. H01M 10/486; H01M 10/617; H01M 10/625; H01M 10/627; H01M 2/1016; H01M 2/1094; H01M 2/1061; H01M 2/1066; H01M 2/1072
See application file for complete search history.

(56) References Cited

U.S. PATENT DOCUMENTS

| | | | |
|---|---|---|---|
| 2007/0087266 A1* | 4/2007 | Bourke | H01M 2/0242 429/159 |
| 2010/0275619 A1 | 11/2010 | Koetting et al. | |
| 2010/0279152 A1 | 11/2010 | Payne | |
| 2013/0071706 A1 | 3/2013 | Lee | |
| 2013/0255293 A1 | 10/2013 | Gadawski et al. | |
| 2014/0038007 A1 | 2/2014 | Ahn | |
| 2015/0325823 A1 | 11/2015 | Smith et al. | |
| 2015/0325894 A1 | 11/2015 | Merriman et al. | |
| 2015/0349392 A1 | 12/2015 | Smith et al. | |

FOREIGN PATENT DOCUMENTS

| | | |
|---|---|---|
| JP | 2007172939 A | 7/2007 |
| JP | 2013152839 | 12/2011 |
| JP | 2013055019 | 3/2013 |
| KR | 20080048138 A | 6/2008 |
| KR | 20100119499 | 6/2012 |
| KR | 1020100119497 | 6/2012 |
| KR | 20120117470 | 10/2012 |
| KR | 1020130031532 | 3/2013 |
| KR | 20130111258 | 10/2013 |
| KR | 101371739 B1 | 3/2014 |
| KR | 1020140019096 | 8/2015 |
| KR | 101564536 B1 | 10/2015 |
| WO | 2015170880 A1 | 11/2015 |

OTHER PUBLICATIONS

U.S. Appl. No. 14/695,367, filed Apr. 24, 2015 entitled Battery Pack.
Search Report for Application No. PCT/KR2016/015366 dated Mar. 30, 2017.

* cited by examiner

| FAN SPEED PERCENTAGE VALUE | BATTERY CELL TEMPERATURE (°C) | DC-DC VOLTAGE CONVERTER TEMPERATURE (°C) | |
|---|---|---|---|
| 0 | <38 | <88 | 502 |
| 0.1 | 38 | 88 | 504 |
| 0.2 | 40 | 90 | 506 |
| 0.3 | 42 | 92 | 508 |
| 0.4 | 44 | 94 | 510 |
| 0.5 | 45 | 96 | 512 |
| 0.6 | 46 | 98 | 514 |
| 0.7 | 47 | 100 | 516 |
| 0.8 | 48 | 102 | 518 |
| 0.9 | 49 | 105 | 520 |
| 1.0 | >50 | >110 | 522 |

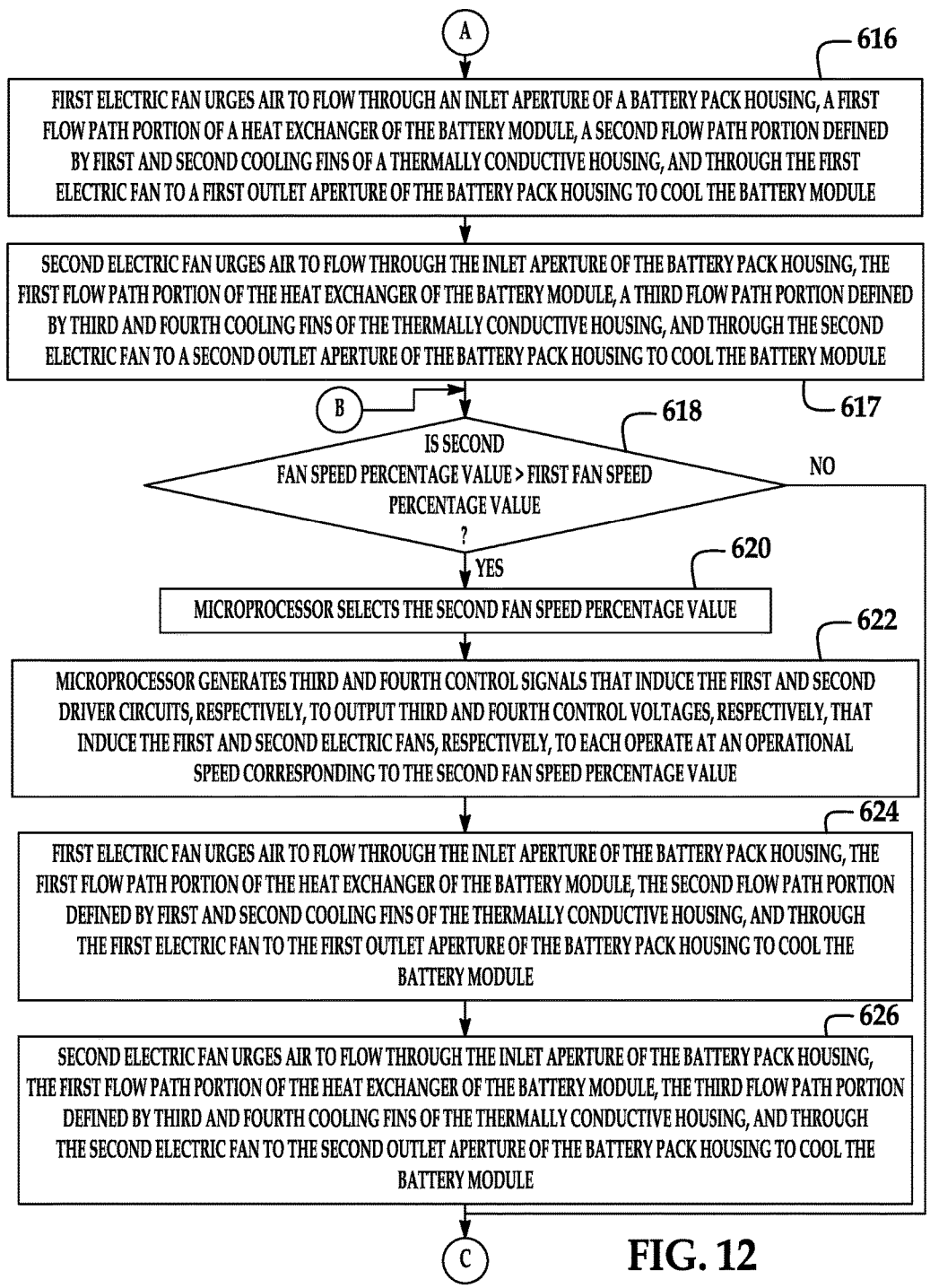

BATTERY PACK

BACKGROUND

The inventors herein have recognized a need for a battery pack having an improved cooling functionality for cooling a battery module therein and a smaller longitudinal length than other battery packs.

SUMMARY

A battery pack in accordance with an exemplary embodiment is provided. The battery pack includes a battery pack housing having a bottom wall, first, second, third and fourth side walls, and a top cover that define an interior region. The first, second, third, and fourth side walls are coupled to the bottom wall. The battery pack housing has an inlet aperture extending therethrough at a first end of the battery pack housing. The battery pack housing has a first outlet aperture extending therethrough at a second end of the battery pack housing. The top cover is coupled to the first, second, third and fourth side walls. The battery pack further includes a battery module that is disposed in the interior region of the battery pack housing a predetermined distance above the bottom wall and proximate to the inlet aperture. The battery module has a first battery cell and a first heat exchanger disposed against one another. The first heat exchanger is disposed substantially parallel to the bottom wall. The first heat exchanger defines a first flow path portion therethrough. The battery pack further includes a first electric fan that is disposed in the interior region of the battery pack housing proximate to the first outlet aperture that fluidly communicates with the first outlet aperture. The battery pack further includes a thermally conductive housing that is disposed in the interior region of the battery pack housing on the bottom wall. The thermally conductive housing has a first housing portion and at least first and second cooling fins coupled to and extending upwardly from the first housing portion. The first and second cooling fins define a second flow path portion therebetween. At least a portion of the second flow path portion is substantially in-line with the first flow path portion. The first housing portion is disposed between the first fan assembly and the battery module. The first electric fan urges air to flow through the inlet aperture, the first flow path portion, the second flow path portion, and through the first electric fan to the first outlet aperture to cool the battery module.

BRIEF DESCRIPTION OF THE DRAWINGS

FIGS. 11-12 are flowcharts of a method for controlling first and second electric fans for cooling a battery module and a DC-DC voltage converter in the battery pack of FIG. 1 in accordance with another exemplary embodiment.

DETAILED DESCRIPTION

Figure 1:
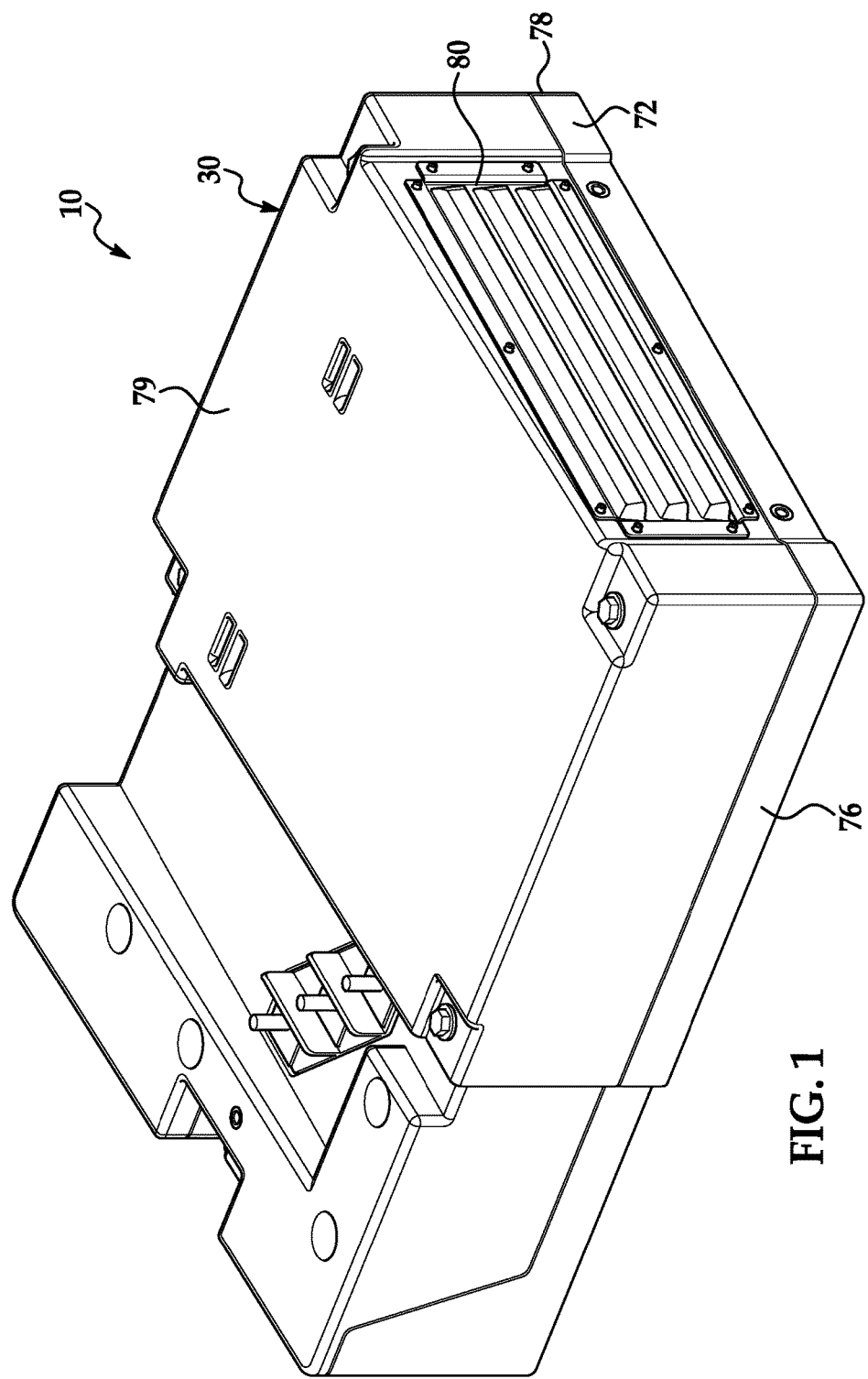
FIG. 1 is a schematic of a battery pack in accordance with an exemplary embodiment.
Figure 3:
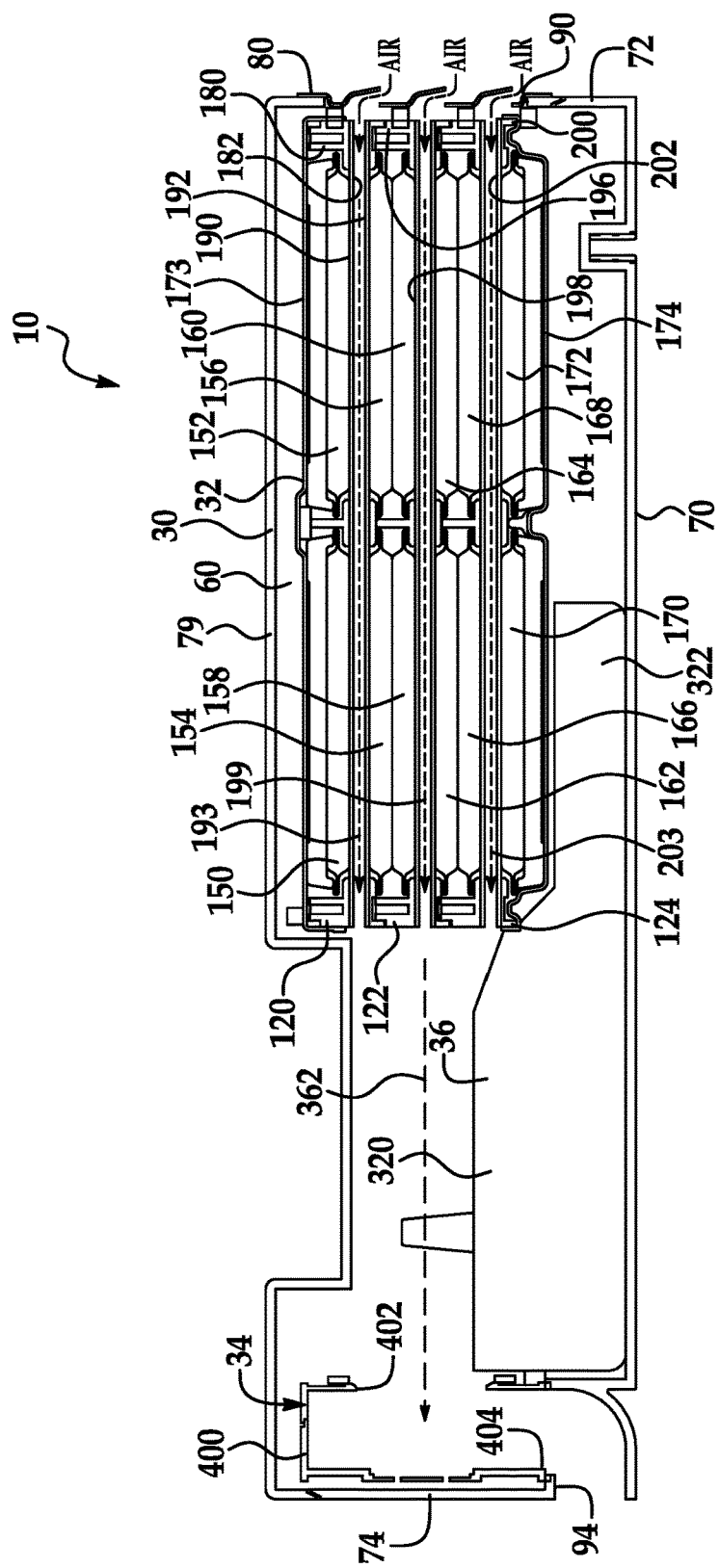
FIG. 3 is a cross-sectional schematic of the battery pack of FIG. 1.
Figure 4:
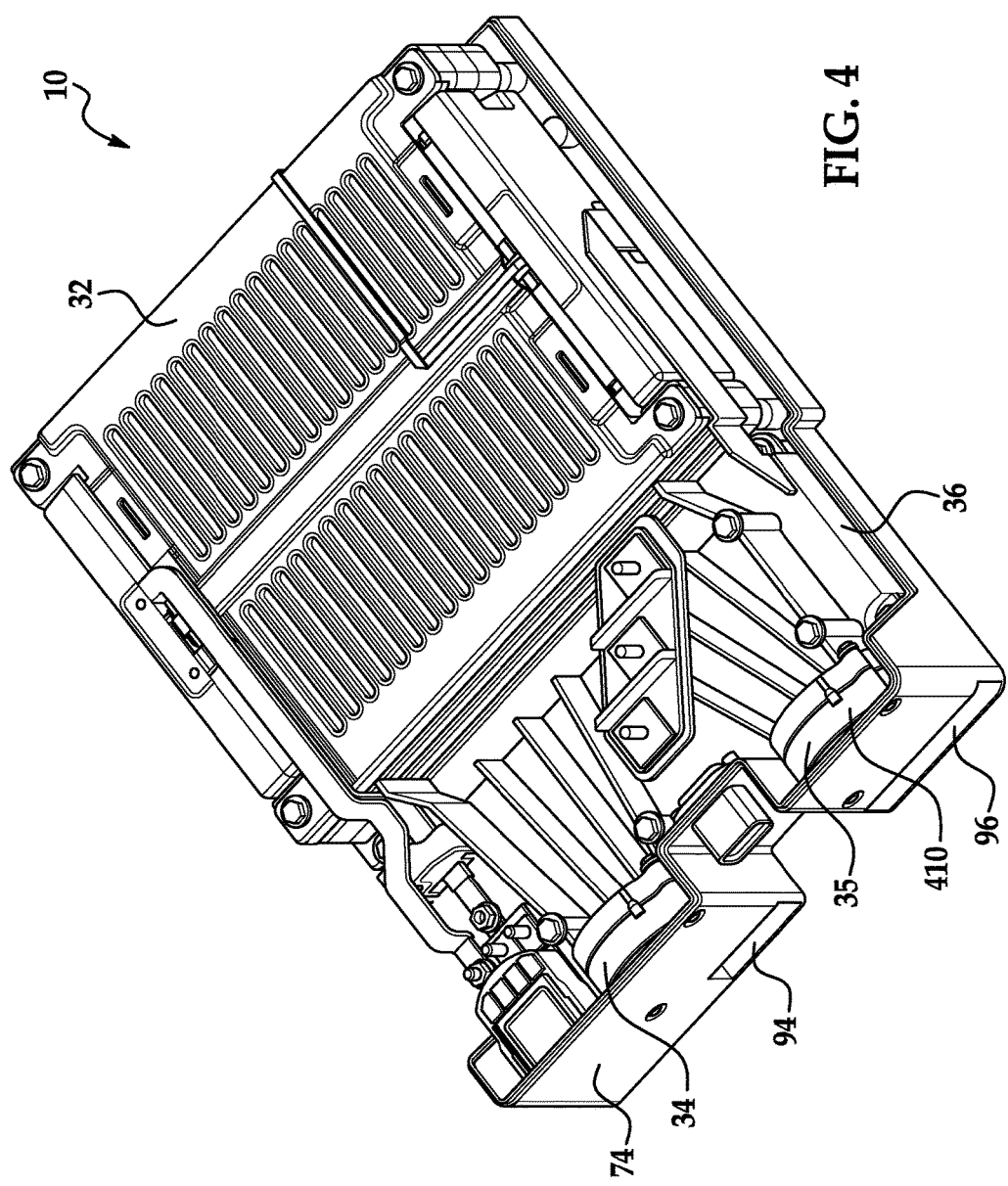
FIG. 4 is another schematic of the battery pack of FIG. 1 with a top cover removed from the battery pack.
Figures 9, 10:
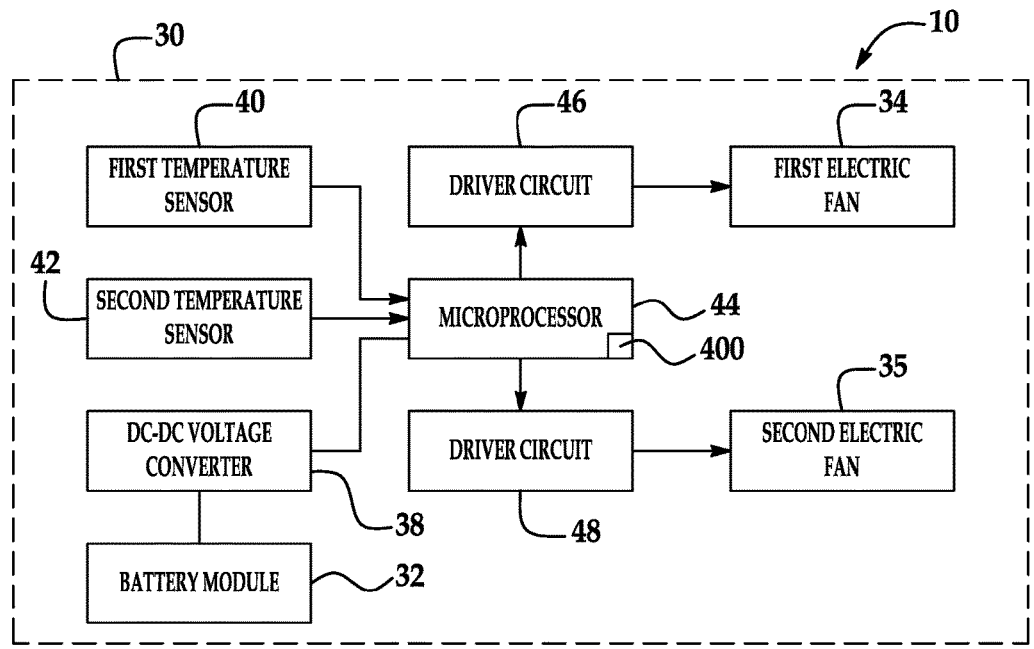
FIG. 9 is a block diagram of a portion of the battery pack of FIG. 1.
FIG. 10 is an exemplary table utilized by a microprocessor in the battery pack of FIG. 1.

Referring to FIGS. 1, 3 and 9, a battery pack 10 in accordance with an exemplary embodiment is provided. The battery pack 10 includes a battery pack housing 30, a battery module 32, first and second electric fans 34, 35, a thermally conductive housing 36, a DC-DC voltage converter 38, first and second temperature sensors 40, 42, a microprocessor 44, and driver circuits 46, 48.

An advantage of the battery pack 10 is that the battery pack 10 has improved air flow characteristics (e.g., substantially linear air flow) and cooling functionality by utilizing the battery module 32 with a first heat exchanger defining a first flow path portion that is substantially in-line and directly fluidly communicating with a second flow path portion defined by first and second cooling fins on the thermally conductive housing 36 for cooling a battery module 32. In particular, the inventors herein have recognized that by utilizing the first flow path portion through the first heat exchanger that is substantially in-line with the second flow path portion across the thermally conductive housing 36, a greater amount of heat energy is transferred from the battery module 32 and the housing 36 to air flowing through the battery pack housing 30. Further, the battery pack 10 has a housing with a smaller longitudinal length by placing a portion of the thermally conductive housing underneath the battery module 32.

For purposes of understanding, the term "substantially in-line" means being arranged in a substantially straight line (e.g., ±15 degrees relative to one another).

Figure 2:
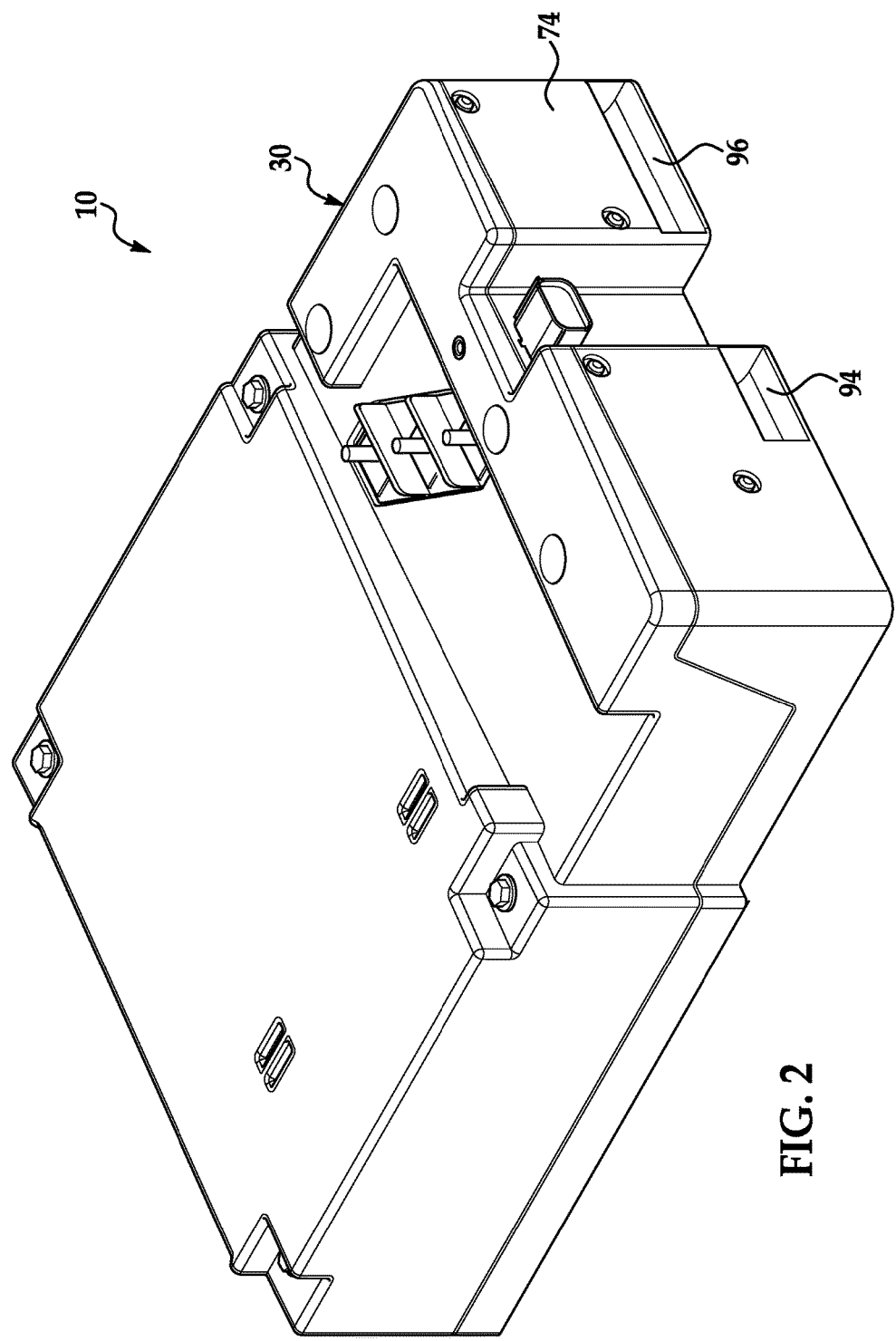
FIG. 2 is another schematic of the battery pack of FIG. 1.

Referring to FIGS. 1-3, the battery pack housing 30 is provided to hold the remaining components of the battery pack 10 therein. The battery pack housing 30 has a bottom wall 70, side walls 72, 74, 76, 78, a top cover 79 that define an interior region 60. The battery pack housing 30 further includes a louver 80. The side walls 72, 74, 76, 78 are coupled to the bottom wall 70 and extend substantially parallel to one another. The side walls 72, 74 are disposed at first and second ends, respectively, of the bottom wall 70. The top cover 79 has an inlet aperture 90 extending therethrough at a first end of the battery pack housing 30. The battery pack housing 70 has outlet apertures 94, 96 extending therethrough at a second end of the battery pack housing 30. The side walls 76, 78 are coupled to the bottom wall 70 and extend substantially parallel to one another. The side walls 76, 78 are coupled to and between the side walls 72, 74. The top cover 79 is removably coupled to the side walls 72, 74, 76, 78 to enclose the interior region 60. In an exemplary embodiment, the bottom wall 70, the side walls 72, 74, 76, 78, and the top cover 79 are constructed of steel or aluminum. In an alternative embodiment, the bottom wall 70, the side walls 72, 74, 76, 78, and the top cover 79 are constructed of plastic.

Figure 7:
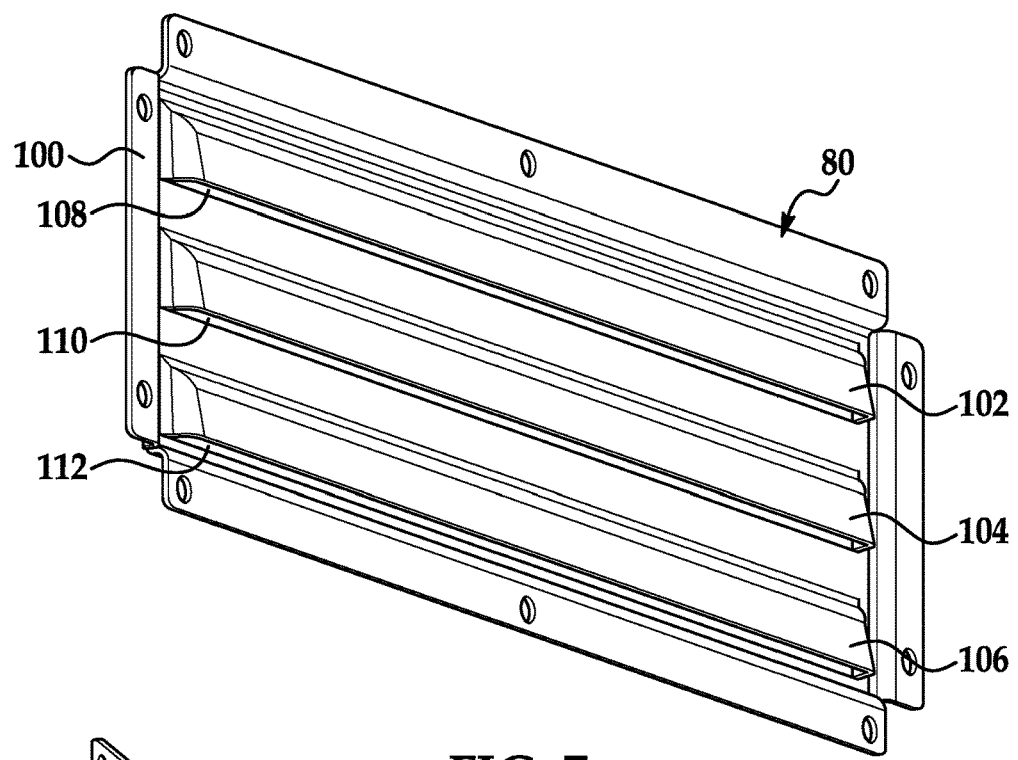
FIG. 7 is a schematic of a louver utilized in the battery pack of FIG. 1.
Figure 8:
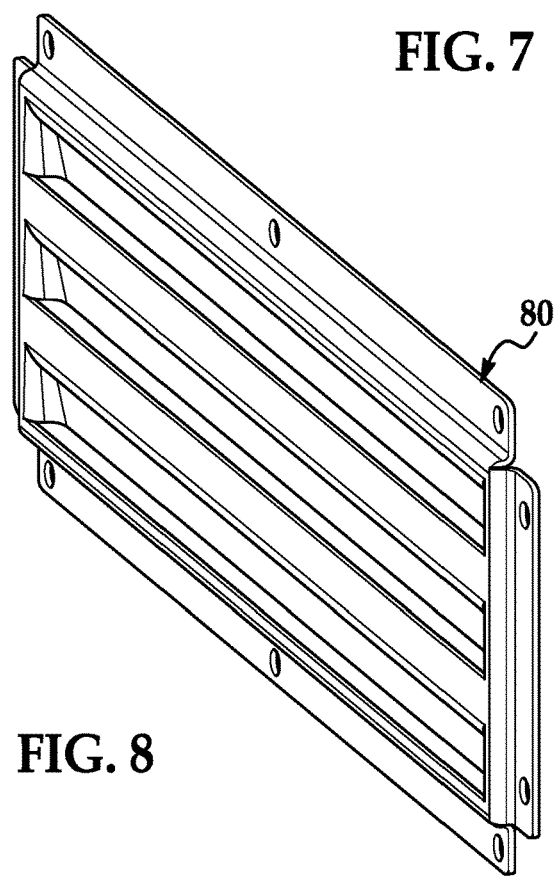
FIG. 8 is another schematic of the louver of FIG. 7.

Referring to FIGS. 3, 7 and 8, the louver 80 is attached to the top cover 79 at the first end of the battery pack housing 30 proximate to the inlet aperture 90. The louver 80 is adapted to allow the air to flow therethrough and further through the inlet aperture 90 into the interior region 60 while preventing water and debris from entering the interior region 60. The louver 80 includes a body 100 and overhang portions 102, 104, 106 extending outwardly from the body 100. The body 100 has apertures 108, 110, 112, respectively, extending therethrough that are disposed proximate to the overhang portions 102, 104, 106, respectively.

Referring to FIG. 3, the battery module 32 is disposed in the interior region 60 proximate to the inlet aperture 90. The battery module 32 includes frame members 120, 122, 124, battery cells 150, 152, 154, 156, 158, 160, 162, 164, 166, 168, 170, 172 and end plates 173, 174.

The frame members 120, 122, 122 are provided to hold the battery cells 154, 156, 158, 160, 162, 164, 166, 168 therebetween. Also, the frame member 120 and the end plate 173 are provided to hold the battery cells 150, 152 therebetween. Further, the frame member 124 and the end plate 174 are provided to hold the battery cells 170, 172 therebetween. The frame member 122 is coupled to and between the frame members 120, 124. The structure of each of the frame members 120, 122, 124 are identical to one another. Accordingly, only the structure of the frame member 120 will be described in greater detail below.

The frame member 120 has a substantially rectangular ring-shaped outer plastic frame 180 and a heat exchanger 182. The heat exchanger 182 has first and second thermally conductive plates 190, 192 that are coupled together and define a flow path portion 193 that extends therethrough. A first side of the heat exchanger 182 directly contacts the battery cells 150, 152, and a second side of the heat exchanger 182 directly contacts the battery cells 154, 156.

The frame member 122 has an identical structure as the frame member 120 described above. The frame member 122 has a substantially rectangular ring-shaped outer plastic frame 196 and a heat exchanger 198. The heat exchanger 198 defines a flow path portion 199 that extends therethrough. A first side of the heat exchanger 198 directly contacts the battery cells 158, 160, and a second side of the heat exchanger 198 directly contacts the battery cells 162, 164.

The frame member 124 has an identical structure as the frame member 120 described above. The frame member 124 has a substantially rectangular ring-shaped outer plastic frame 200 and a heat exchanger 202. The heat exchanger 202 defines a flow path portion 203 that extends therethrough. A first side of the heat exchanger 202 directly contacts the battery cells 166, 168, and a second side of the heat exchanger 202 directly contacts the battery cells 170, 172.

The battery cells 150, 152, 154, 156, 158, 160, 162, 164, 166, 168, 170, 172 are each configured to generate an operational voltage. In one exemplary embodiment, the battery cells 150-172 are pouch-type lithium-ion battery cells that have a substantially rectangular-shaped body portion and a pair of electrical terminals. In an exemplary embodiment, the battery cells 150-172 are electrically coupled in series with one another. In an exemplary embodiment, the structure of the battery cells 150-172 are identical to one another.

Referring to FIGS. 3-5 and 9, the thermally conductive housing 36 is provided to hold the DC-DC voltage converter 38 therein that is electrically coupled to the battery cells 150-172 of the battery module 32. The thermally conductive housing 36 transfers heat from the DC-DC voltage converter 38 to air flowing past the thermally conductive housing 36.

The thermally conductive housing 36 is disposed in the interior region 60 of the battery pack housing 30 on the bottom wall 70. The thermally conductive housing 36 has a first housing portion 320, a second housing portion 322, and cooling fins 330, 332, 334, 336, 340, 342, 344, 346. The first housing portion 320 is coupled to the second housing portion 322, and the cooling fins 330-346 are coupled to and extend upwardly from the first housing portion 320. The first housing portion 320 is disposed on the bottom wall 70 between the first electric fan 34 and the battery module 32, and is further disposed between the second electric fan 35 and the battery module 32. The second housing portion 322 is disposed between the battery module 32 and the bottom wall 70 of the battery pack housing 30. Further, the second housing portion 322 is disposed on the bottom wall 70 and supports an end portion of the battery module 32.

Figure 5:
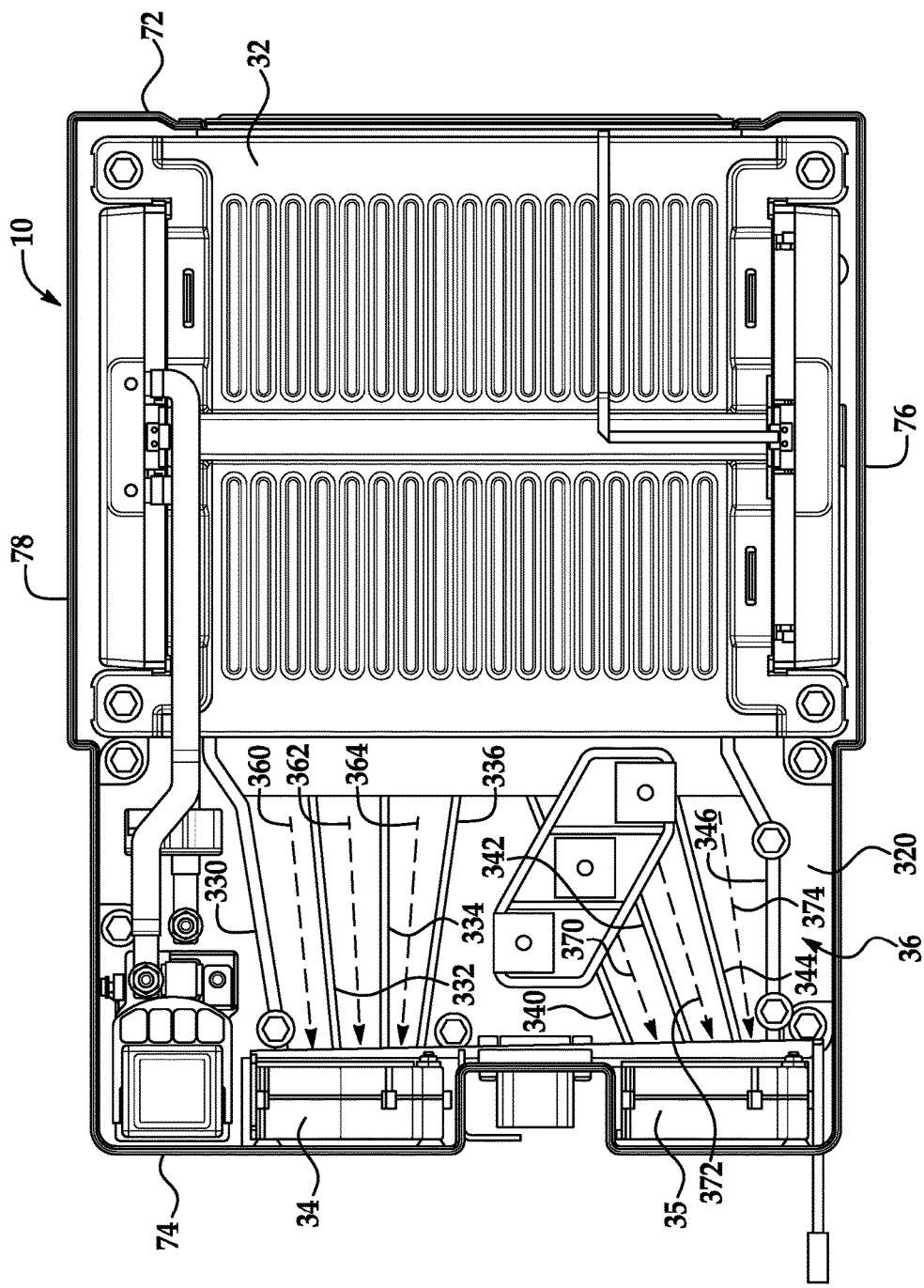
FIG. 5 is another schematic of the battery pack of FIG. 1 with the top cover removed from the battery pack.
Figure 6:
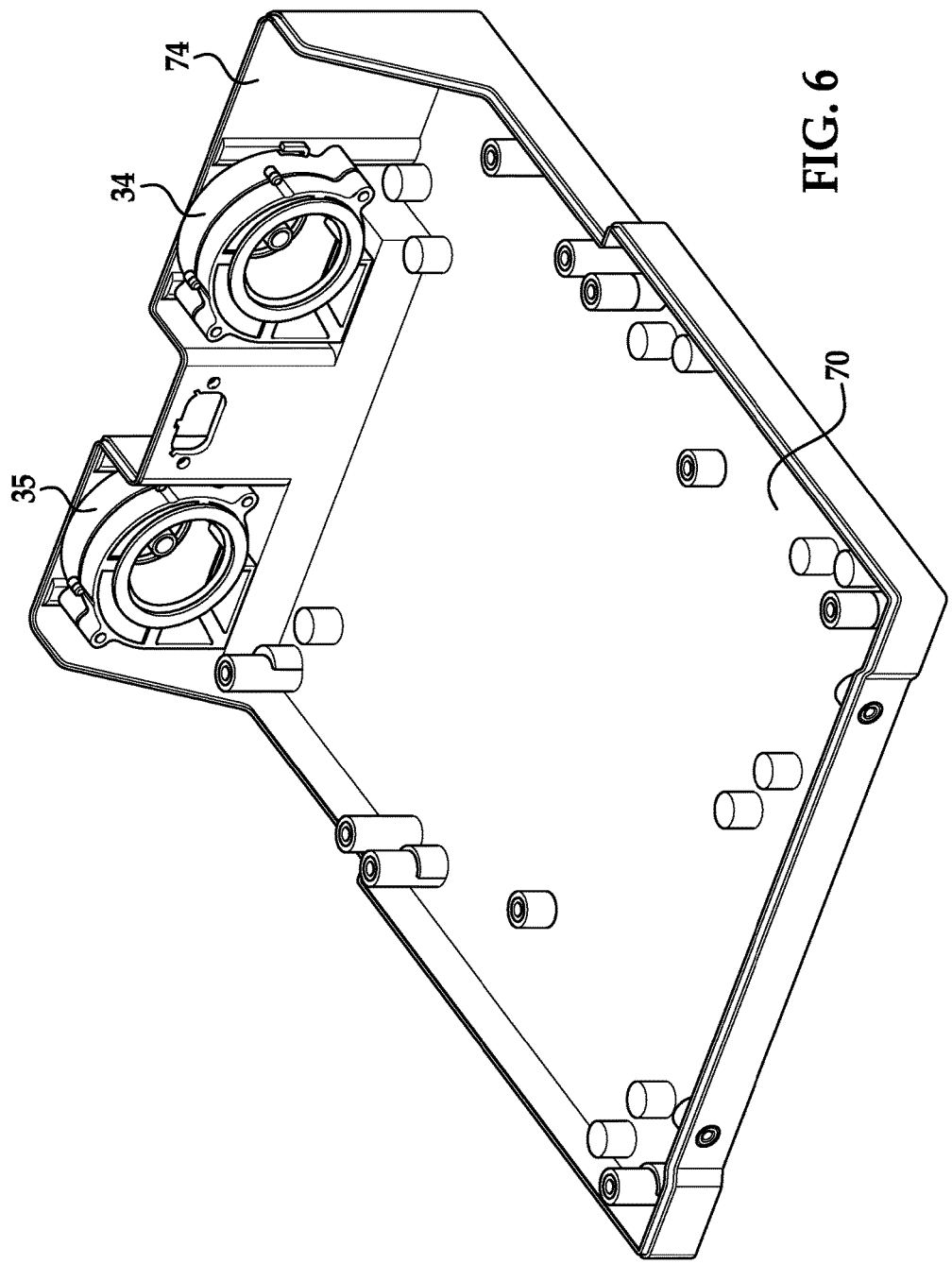
FIG. 6 is another schematic of a portion of the battery pack of FIG. 1.

Referring to FIGS. 3 and 5, the cooling fins 330, 332 define a flow path portion 360 therebetween that extends between the battery module 32 and the first electric fan 34. Further, the cooling fins 332, 334 define a flow path portion 362 therebetween that extends between the battery module 32 and the first electric fan 34. At least a portion of the flow path portion 362 is substantially in-line and directly fluidly communicating with the flow path portion 199 (shown in FIG. 3) of the heat exchanger 198. The cooling fins 334, 336 define a flow path portion 364 therebetween that extends between the battery module 32 and the first electric fan 34.

Further, the cooling fins 340, 342 define a flow path portion 370 therebetween that extends between the battery module 32 and the second electric fan 35. The cooling fins 342, 344 define a flow path portion 372 therebetween that extends between the battery module 32 and the second electric fan 35. Also, the cooling fins 344, 346 define a flow path portion 374 therebetween that extends between the battery module 32 and the second electric fan 35.

In an exemplary embodiment, the thermally conductive housing 36 is constructed of aluminum. Of course, in an alternative embodiment, the thermally conductive housing 36 can be constructed of other materials such as steel or other metal alloys for example.

Referring to FIGS. 3-5 and 9, the first electric fan 34 is provided to urge air through the interior region 60 of the battery pack housing 30 to cool the battery module 32 and the DC-DC voltage converter 38. The first electric fan 34 includes a housing 400 which defines a central aperture 402 and a bottom outlet aperture 404. The first electric fan 34 includes an internal motor and fan blades (not shown) which urge air into the central aperture 402 and through an interior portion of the housing 400, and the air exits the bottom outlet aperture 404. The driver circuit 46 (shown in FIG. 9) is electrically coupled to the first electric fan 34 and provides a control voltage for controlling operation of the first electric fan 34. During operation, the first electric fan 34 urges air through the inlet aperture 90 of the battery pack housing 30 and further through the flow path portions 193, 199, 203 of the heat exchangers 182, 198, 202, respectively, and further through the flow path portions 360, 362, 364 to the first electric fan 34—and further through the outlet aperture 94 for cooling the battery module 32 and the DC-DC voltage converter 38.

The second electric fan 35 is provided to urge air through the interior region 60 of the battery pack housing 30 to cool the battery module 32 and the DC-DC voltage converter 38. The second electric fan 35 has a structure substantially identical to the first electric fan 34. The second electric fan 35 includes a housing 410 which defines a central aperture and a bottom outlet aperture. The second electric fan 35 includes an internal motor and fan blades (not shown) which urge air into the central aperture thereof and through an interior portion of the housing 410, and the air exits the bottom outlet aperture thereof. The driver circuit 48 (shown in FIG. 9) is electrically coupled to the second electric fan 35 and provides a control voltage for controlling operation of the second electric fan 35. During operation, the second electric fan 35 urges air through the inlet aperture 90 of the battery pack housing 30 and further through the flow path portions 193, 199, 203 of the heat exchangers 182, 198, 202, respectively, and further through the flow path portions 370, 372, 374 to the second electric fan 35—and further through the outlet aperture 96 for cooling the battery module 32 and the DC-DC voltage converter 38.

Referring to FIGS. 3 and 9, the first temperature sensor 40 is disposed in the interior region 60 of the battery pack housing 30 proximate to at least one battery cell of the battery module 32. The first temperature sensor 40 is configured to generate a temperature signal indicative of a temperature level of the battery module 32.

The second temperature sensor 42 is disposed in the interior region 60 of the battery pack housing 30 proximate to the DC-DC voltage converter 38. The second temperature sensor 42 is configured to generate a temperature signal indicative of a temperature level of the DC-DC voltage converter 38.

The microprocessor 44 is operably and electrically coupled to the first temperature sensor 40, the second temperature sensor 42, and the driver circuits 46, 48. In an exemplary embodiment, the microprocessor 44 is programmed to receive first and second temperature signals from the first and second temperature sensors 40, 42, respectively, and to generate first and second voltage signals based on the first and second temperature signals, respectively, to induce the driver circuits 46, 48, respectively, to control operation of the first and second electric fans 34, 35 respectively, as will be described in greater detail below. The microprocessor 44 has a memory device 400 which stores software instructions and data for implementing at least portions of the method for controlling the first and second electric fans 34, 35.

Referring to FIGS. 9 and 10, an exemplary table 500 stored in the memory device 400 which can be utilized by the microprocessor 44 for controlling an operational speed of the first and second electric fans 34, 35 for cooling the battery module 32 and the DC-DC voltage converter 38 is illustrated. The table 500 includes records 502, 504, 506, 508, 510, 512, 514, 516, 518, 520, 522. Each record includes the following fields: (i) fan speed percentage value, (ii) battery cell temperature and (iii) DC-DC voltage converter temperature. The fan speed percentage value corresponds to a percentage of a threshold or maximum operational speed (e.g., 13,000 RPM) associated with each of the first and second electric fans 220, 222. The microprocessor 44 determines a battery cell temperature level, and a DC-DC voltage converter temperature level and then utilizes these values as indexes in the table 500 to determine corresponding fan speed percentage values for each of the first and second electric fans 34, 35. Then, the microprocessor 44 selects the highest fan speed percentage value from the two values, and then generates a control value that induces the first and second electric fans 34, 35 to operate at an operational speed corresponding to the highest fan speed percentage value. For example, if a battery cell temperature value equals 38 degrees Celsius, the microprocessor 44 can access the record 504 and select a first fan speed percentage value of 0.1 corresponding to 10% of a threshold operational speed of each of the first and second electric fans 34, 35. Further, if a DC-DC voltage converter temperature value equals 90 degrees Celsius, the microprocessor 44 can access the record 506 and select a second fan speed percentage value of 0.2 corresponding to 20% of a threshold operational speed of each of the first and second electric fans 34, 35. Thereafter, the microprocessor 44 selects the highest of the fan speed percentage value of 0.1 and 0.2 which corresponds to 0.2 for controlling each of the first and second electric fans 34, 35.

Figure 11:
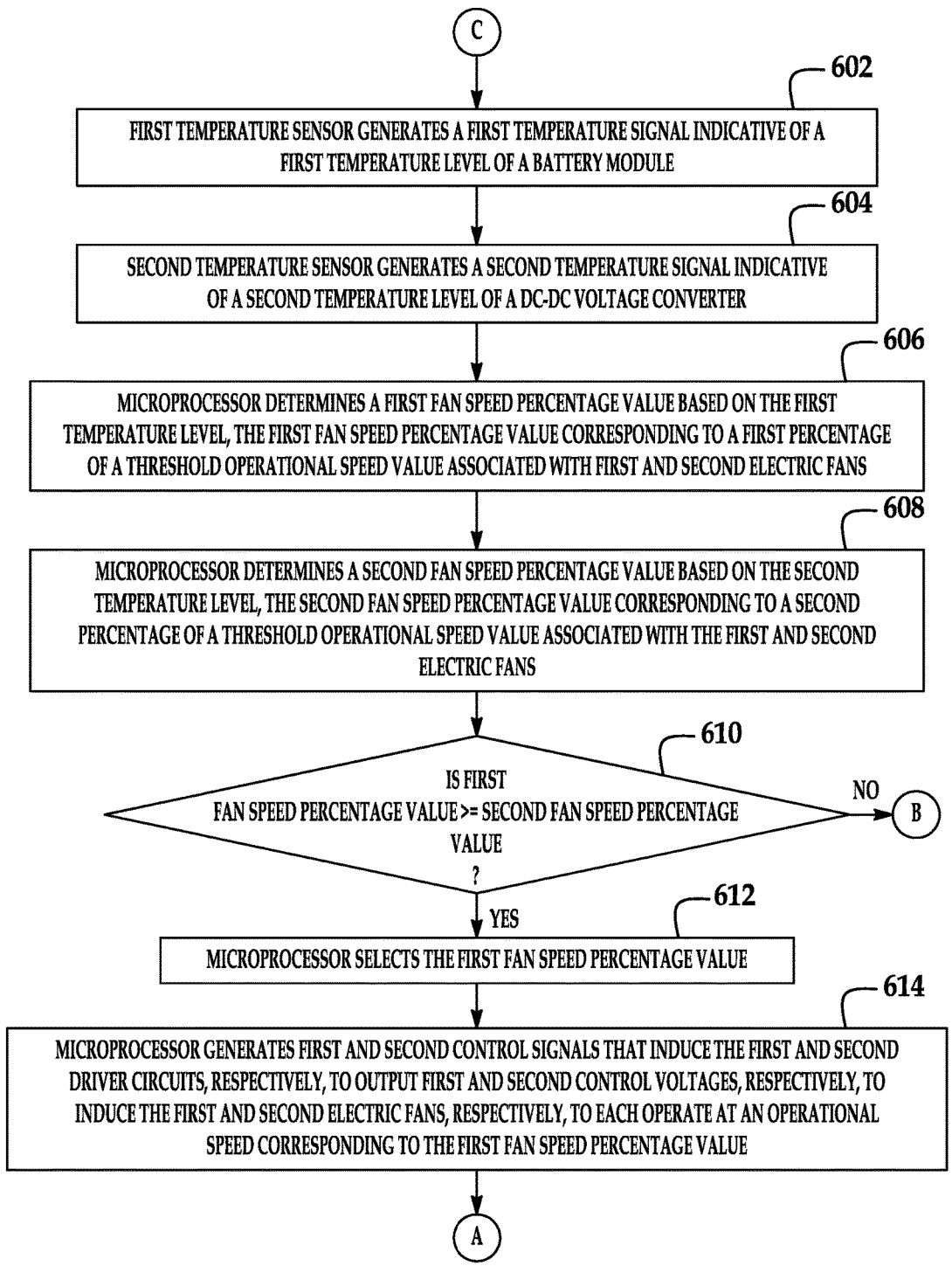

Referring to FIGS. 9, 11 and 12, a flowchart of a method for controlling the first and second electric fans 34, 35 for cooling the battery module 32 and the DC-DC voltage converter 38 in accordance with another exemplary embodiment is provided.

At step 602, the first temperature sensor 40 generates a first temperature signal indicative of a first temperature level of the battery module 32. After step 602, the method advances to step 604.

At step 604, the second temperature sensor 42 generates a second temperature signal indicative of a second temperature level of the DC-DC voltage converter 38. After step 604, the method advances to step 606.

At step 606, the microprocessor 44 determines a first fan speed percentage value based on the first temperature level. The first fan speed percentage value corresponds to a first percentage of a threshold operational speed value associated with first and second electric fans 34, 35. After step 606, the method advances to step 608.

At step 608, the microprocessor 44 determines a second fan speed percentage value based on the second temperature level. The second fan speed percentage value corresponds to a second percentage of the threshold operational speed value associated with the first and second electric fans 34, 35. After step 608, the method advances to step 610.

At step 610, the microprocessor 44 makes a determination as to whether the first fan speed percentage value is greater than or equal to the second fan speed percentage value. If the value of step 610 equals "yes", the method advances to step 612. Otherwise, the method advances to step 618.

At step 612, the microprocessor 44 selects the first fan speed percentage value. After step 612, the method advances to step 614.

At step 614, the microprocessor 44 generates first and second control signals that induce the first and second driver circuits 46, 48, respectively, to output first and second control voltages, respectively, to induce the first and second electric fans 34, 35, respectively, to each operate at an operational speed corresponding to the first fan speed percentage value. After step 614, the method advances to step 616.

At step 616, the first electric fan 34 urges air to flow through the inlet aperture 90 of the battery pack housing 30, the flow path portion 199 (shown in FIG. 3) of the heat exchanger 198 of the battery module 32, the flow path portion 362 defined by cooling fins 332, 334 (shown in FIG. 5) of the thermally conductive housing 36, and through the first electric fan 34 to the outlet aperture 94 (shown in FIG. 4) of the battery pack housing 30 to cool the battery module 32. After step 616, the method advances to step 617.

At step 617, the second electric fan 35 urges air to flow through the inlet aperture 90 of the battery pack housing 30, the flow path portion 199 of the heat exchanger 198 of battery module 32, the flow path portion 372 (shown in FIG. 5) defined by cooling fins 342, 344 of the thermally conductive housing 36, and through the second electric fan 35 to an outlet aperture 96 of the battery pack housing 30 to cool the battery module 32. After step 617, the method advances to step 618.

At step 618, the microprocessor 44 makes a determination as to whether the second fan speed percentage value is greater than the first fan speed percentage value. If the value of step 618 equals "yes", the method advances to step 620. Otherwise, the method returns to step 602.

At step 620, the microprocessor 44 selects the second fan speed percentage value. After step 620, the method advances to step 622.

At step 622, the microprocessor 44 generates third and fourth control signals that induce the first and second driver circuits 46, 48, respectively, to output third and fourth control voltages, respectively, that induce the first and second electric fans 220, 222, respectively, to each operate at an operational speed corresponding to the second fan speed percentage value. After step 622, the method advances to step 624.

At step 624, the first electric fan 34 urges air to flow through the inlet aperture 90 of the battery pack housing 30, the flow path portion 199 (shown in FIG. 3) of the heat exchanger 198 of the battery module 32, the flow path portion 362 defined by cooling fins 332, 334 (shown in FIG. 5) of the thermally conductive housing 36, and through the first electric fan 34 to the outlet aperture 94 (shown in FIG. 4) of the battery pack housing 30 to cool the battery module 32. While performing step 624, the method also performs step 626.

At step 626, the second electric fan 35 urges air to flow through the inlet aperture 90 of the battery pack housing 30, the flow path portion 199 of the heat exchanger 198 of battery module 32, the flow path portion 372 (shown in FIG. 5) defined by cooling fins 342, 344 of the thermally conductive housing 36, and through the second electric fan 35 to an outlet aperture 96 of the battery pack housing 30 to cool the battery module 32. After step 626, the method returns to step 602.

The above-described method can be at least partially embodied in the form of one or more memory devices or computer readable media having computer-executable instructions for practicing the methods. The memory devices can comprise one or more of the following: hard drives, RAM memory, flash memory, and other computer-readable media known to those skilled in the art; wherein, when the computer-executable instructions are loaded into and executed by one or more computers or microprocessors, the one or more computers or microprocessors become an apparatus programmed to practice the associated steps of the method.

The battery pack described herein provides a substantial advantage over other battery packs. In particular, the battery pack has improved air flow characteristics by utilizing a battery module with a first heat exchanger defining a first flow path portion that is substantially in-line with a second flow path portion defined by first and second cooling fins on the thermally conductive housing for cooling a battery module. Further, the battery pack has a housing with a smaller longitudinal length by placing a portion of the thermally conductive housing underneath the battery module.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery pack, comprising:
a battery pack housing having a bottom wall, first, second, third and fourth side walls, and a top cover that define an interior region; the first, second, third, and fourth side walls being coupled to the bottom wall; the battery pack housing having an inlet aperture extending therethrough at a first end of the battery pack housing, the battery pack housing having a first outlet aperture extending therethrough at a second end of the battery pack housing; the top cover being coupled to the first, second, third and fourth side walls;
a battery module being disposed in the interior region of the battery pack housing a predetermined distance above the bottom wall and proximate to the inlet aperture; the battery module having a first battery cell and a first heat exchanger disposed against one another; the first heat exchanger being disposed substantially parallel to the bottom wall, the first heat exchanger defining a first flow path portion therethrough;
a first electric fan being disposed in the interior region of the battery pack housing proximate to the first outlet aperture that fluidly communicates with the first outlet aperture;
a thermally conductive housing being disposed in the interior region of the battery pack housing on the bottom wall; the thermally conductive housing having a first housing portion and at least first and second cooling fins being coupled to and extending upwardly from the first housing portion, the first and second cooling fins defining a second flow path portion therebetween, and at least a portion of the second flow path portion being substantially in-line with the first flow path portion, the first housing portion being disposed between the first electric fan and the battery module; and
the first electric fan adapted to urge air to flow through the inlet aperture, the first flow path portion, the second flow path portion, and through the first electric fan to the first outlet aperture to cool the battery module.

2. The battery pack of claim 1, further comprising a second electric fan communicating with a second outlet aperture in the battery pack housing, the thermally conductive housing further includes third and fourth cooling fins being coupled to and extending upwardly from the first housing portion, the third and fourth cooling fins defining a third flow path portion therebetween, and at least a portion of the third flow path portion being substantially in-line with the first flow path portion; and
the second electric fan adapted to urge air to flow through the inlet aperture, the first flow path portion, the third flow path portion, and through the second electric fan to the second outlet aperture to cool the battery module.

3. The battery pack of claim 1, wherein the thermally conductive housing further includes a second housing portion disposed between the battery module and the bottom wall of the battery pack housing.

4. The battery pack of claim 1, wherein the battery module further includes a second battery cell and a second heat exchanger disposed against one another; the second heat exchanger being disposed substantially parallel to the bottom wall, the second heat exchanger defining a third flow path portion therethrough.

5. The battery pack of claim 4, wherein the third flow path portion is substantially in-line with a portion of the interior region disposed above the first and second cooling fins of the thermally conductive housing.

6. The battery pack of claim 1, wherein the thermally conductive housing holds a DC-DC voltage converter therein that is electrically coupled to the first battery cell of the battery module.

7. The battery pack of claim 1, wherein the thermally conductive housing is constructed of aluminum.

8. The battery pack of claim 1, wherein the first battery cell is disposed against a first side of the first heat exchanger, the battery module further having a second battery cell disposed against the first side of the first heat exchanger.

9. The battery pack of claim 1, wherein the first heat exchanger comprises first and second thermally conductive plates being coupled together and defining the first flow path portion extending therethrough.

10. The battery pack of claim 1, further comprising a louver attached to the first side wall proximate to the inlet aperture, the louver adapted to allow the air to flow therethrough into the interior region while preventing water and debris from entering the interior region.

* * * * *